United States Patent [19]

Friedrich et al.

[11] 3,879,346

[45] Apr. 22, 1975

[54] THERMOPLASTICS WITH GOOD ANTISTATIC PROPERTIES AND IMPROVED PROCESSING PROPERTIES

[75] Inventors: Hans-Helmut Friedrich, Philippstaal, Germany; Helmut Linhart, Reinach, Switzerland; Hermann Otto Wirth, Bensheim-Auerbach, Germany

[73] Assignee: Ciba-Geigy Corporation, Ardsley, N.Y.

[22] Filed: July 9, 1973

[21] Appl. No.: 377,669

[30] Foreign Application Priority Data
July 11, 1972   Germany............................ 2234016
May 17, 1973   Germany............................ 2324888

[52] U.S. Cl. 260/45.95 S; 260/33.2 R; 260/45.95 L; 260/77.5 SS; 260/94.9 GD; 260/836; 260/858; 260/830 P; 260/DIG. 15; 260/DIG. 21
[51] Int. Cl. ............................................ C08f 45/58
[58] Field of Search 260/DIG. 15, DIG.21, 45.95 L, 260/45.95 S, 33.2 R, 94.9 GD, 77.5 SS, 836, 858, 830 P

[56] References Cited
UNITED STATES PATENTS

| | | | |
|---|---|---|---|
| 2,564,795 | 8/1951 | Sibley............................ | 260/45.95 L |
| 2,624,719 | 1/1953 | Roche et al.................... | 260/33.2 R |
| 3,234,170 | 2/1966 | Stumpf et al.................. | 260/33.2 R |
| 3,446,764 | 5/1969 | Phillips........................... | 260/33.2 R |

FOREIGN PATENTS OR APPLICATIONS

| | | | |
|---|---|---|---|
| 847,106 | 9/1960 | United Kingdom.......... | 260/DIG. 21 |

*Primary Examiner*—Melvyn I. Marquis
*Attorney, Agent, or Firm*—Nestor W. Shust; Luther A. R. Hall

[57] ABSTRACT

Disclosed are plastics compositions comprising thermoplastics, especially polyolefines, and a minor proportion of glycerine monoethers or glycerine monothioethers or substances derived therefrom. The new compositions possess in particular good antistatic properties and also improved processing and colour stability.

10 Claims, No Drawings

THERMOPLASTICS WITH GOOD ANTISTATIC PROPERTIES AND IMPROVED PROCESSING PROPERTIES

The invention relates to plastics compositions and mouldings, films and fibres which can be manufactured therefrom, having good antistatic properties and improved processing and colour stability.

The thermoplastics concerned are thermoplastics such as polyolefines, polyamides, polystyrene and styrene copolymers, polyacrylonitrile, polyurethanes, polyesters, polyvinyl chlorides and polyacetals which acquire the improved properties mentioned through containing glycerine monoethers and substances derived therefrom.

It is known that a reduction in the electrostatic charge of mouldings, films and fibres of thermoplastics can be achieved by addding to the plastic melt, during processing, substances which because of their specific incompatibility accumulate on the surface and because of their special structure increase the surface conductivity so greatly that spark formation, or dust attraction, resulting from becoming electrostatically charged no longer occur.

The antistatic agents for the finishing of thermoplastics which are used industrially all suffer from disadvantages and shortcomings which relate, in particular, to their inadequate chemical stability and above all heat stability.

The products of the amine type such as, for example, the fatty alkyl—($C_{12}$-$C_{18}$)—diethanolamines, impair the colour stability and light stability of the plastics provided therewith; in addition, their volatility is considerable. Finally, being amines, they are not physiologically harmless. Physiological harmlessness is a very critical point in antistatic agents, especially in those plastics which are employed for food stuff packagings. In accordance with the use for which they are intended, these substances accumulate at the surface of the plastic or are subequently applied thereto and are therefore exposed to increased extraction, especially by liquid foodstuffs. Thus, for example, the antistatic agent based on fatty alkyl—($C_{12}$-$C_{18}$)-diethanolamine has, according to the recommendations of the Plastics Commission of the BGA, been restricted to an added concentration of 0.1 percent, for example in polyethylene.

The effects of the polyglycol ethers and polyglycol esters are very weak and in addition characterised by inadequate intrinsic stability. This is also true of the partial esters of glycerine and other polyols.

Antistatics based on "-ate" and "-onium" salts in part show a good effect, but are not sufficiently stable at the processing temperatures which nowadays are very high; they lose their effect on decomposition.

It is the task of the present invention to develop antistatic agents which are characterised by a good effect, which furthermore possess a higher intrinsic stability and lower volatility and hence permit higher processing temperatures to be used for the appropriate thermoplastics, and which, not least of all, are distinguished by physiological harmlessness.

It has now been found that using glycerine monoethers and glycerine monothioethers and substances derived. therefrom it is possible to achieve, in thermoplastics, a substantially reduced electrostatic charge and, associated therewith, pronounced "anti-fogging" properties, this being true both of internal incorporation and external application.

Furthermore, these products impart to the thermoplastics increased stability on processing and produce a stabilisation of the substrate colour, that is to say prevent a discolouration, which is an additional advantage since themoplastics, particularly the polymers manufactured with ZIEGLER-NATTA catalysts, suffer degradation which cannot be eliminated entirely by antioxidants such as hindered phenols. This thermal degradation, which is recognisable, inter alia, from an increase in the melt index, utimately temperatures to a limitation of the processing temperatues and hence of the output during processing.

In addition to this thermo-oxidative degradation discolourations manifest themselves when processing such plastics, especially polyolefines, which cannot be prevented even by antioxidants.

It has now been found that these shortcomings can additionally be eliminated with the substances according to the invention.

The present invention therefore relates to antistatic thermoplastics which contain 0.01 – 5 percent by weight, preferably 0.05 – 2 percent by weight, relative to the thermoplastic, of a compound or mixtures of the formula I $$R-X-(CH_2-Y-O-)_nH$$

(I)

in which X denotes —O—, —S— or $SO_2$—, Y denotes

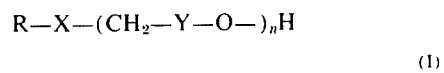
or
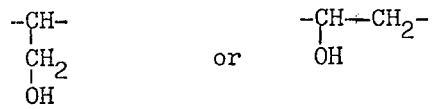

$n$ denotes the number 1 to 5, preferably 1 (for compounds) or, for statistical mixtures, $\bar{n}$ (as an average value) denotes a number between 0.5 and 8, preferably 1 to 3, and R, in the case of $n = 1$ (individual compounds) denotes alkyl or phenylalkyl with 12 to 30 C atoms, preferably with 12 to 18 C atoms, which can be linear or have short chain branches of not more than 2 C atoms, and can be also be interrupted, preferably only once, by one or more different groups such as —O—, —S —, —$CO_2$—, —HC=CH—, phenylene or $$\begin{array}{c}-HC-\\ OH\end{array}$$

or R, in the case of $n = 2$ to 5 (individual compounds) or $\bar{n} = 0.5$ to 8 (mixtures), denotes alkyl with 8 to 30 C atoms, preferably with 12 to 18 C atoms, which can be linear or branched and can also be interrupted, preferably only once, by —O—, —S —, —$CO_2$—, —HC=CH —or $$\begin{array}{c}-HC-,\\ OH\end{array}$$

phenylalkyl with an alkylene radical of 1 to 3 C atoms, preferably with 3 C atoms, which can addtionally be substituted at the phenyl nucleus by alkyl with up to 18 C atoms, with the entire radical having to contain a total of at least 9 C atoms, alkylphenyl with a total of 9 to 30 atoms, preferably 14 to 15 C atoms, alkoxyphenyl with 3 to 12 C atoms in the alkyl radical, preferably 3 to 8 C atoms, alkoxycarbonylphenyl with 2 to 18 C atoms in the alkyl radical, or cycloalkyl with a total of 9 to 30 C atoms, preferably with 9 to 15 C atoms, and, optionally, in addition to further additives, at most 1 percent by weight of hydrophilic polymers relative to the thermoplastic, but preferably no hydrophilic polymers.

The term short-chain branching denotes that the linear alkyl chain is substituted by one or more methyl or ethyl groups.

Amongst the substances of the formula I, preferred substances are those in which X represents O or S, $n$ represent 1 or $\bar{n}$ (as average value) represents a number between 1 and 5 and R represents unbranched alkyl with 12 to 18 C atoms, alkylphenyl with 9 to 12 C atoms in the alkyl chain or alkylbenzyl with 9 to 12 C atoms in the alkyl chain, and amongst those especially the substances in which X = 0 and R represents an unbranched alkyl with 12 - 18 C atoms.

Mixed products of the formula

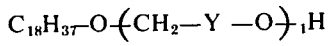

are particularly valuable.

Preferably, according to the present invention, polyolefins, especially polypropylenes or high pressure polyethylenes, polyvinyl chlorides or polyurethanes are provided with an antistatic finish.

Some of the substances used according to the application are previously known as compounds. However, the use, disclosed here, as antistatic agents for thermoplastics, is not previously known.

In Compt. Rend. 258 (26), 6,466 (1964), British Pat. No. 1,029,610 and J. Org. Chem. 26,615 (1961), some representatives of these classes of compounds have already been described. Furthemore, Belgian Pat. No. 767,021 claims polycondensation products of glycidol with 1,2-dihydroxyalkanes as detergents, especially for cosmetics, with anionic catalysts serving as condensation agents.

In Belgian Pat. No. 767,020, polycondensation products of glycidol with mercaptans functions as intermediate steps for sulphoxides which can be manufactured therefrom, and the sulphoxides in turn can be used as cosmetic detergents.

It is furthermore known, from U.S. Pat. No. 3,375,213 to employ the synergistic combination of hydrophilic polymers with alkyl ethers and alkyl esters of polyhydroxy compounds for improving the dyestuff receptivity of polyolefines.

It has now been found that the sole use of glycerine monoethers and substances related thereto imparts to thermoplastics a property independent therefrom, namely an antistatic property, without the additional manifestation of the disadvantage of an unfavourable effect on the mechanical properties and processing properties of these polymers through the content of a hydrophilic polymer.

Admittedly, U.S. Pat. No. 2,624,719 describes secondary alcohols or ether-alcohols, such as, for example, 3-ethoxy-1,2-propanediol, as auxiliaries for improving the colour of polystryrene. However, the products of the present invention are distinctly superior to these additives in this effect also.

Examples of compounds according to the formula I which are used according to the invention are:

a.  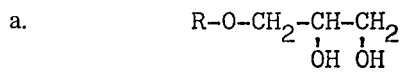

R: n-dodecyl, n-tetradecyl, n-octadecyl, 2-ethylhexadecyl, oleyl, 2-methyl-uncosyl, n-octacosyl, iso-tetra-tridecyl, n-tetracosyl, nonyl-phenyl, dodecyl-phenyl, 4-cyclohexyl-phenyl, t-butyl-phenyl, t-octyl-phenyl, 4-propoxy-phenyl, 4-lauryloxy-phenyl, 3-(i-octyloxy)-phenyl, 4-hexyloxycarbonyl-phenyl, 3-octadecyloxycarbonyl-phenyl, 4-cyclohexyloxycarbonyl-phenyl, 4-nonyl-cyclohexyl, 3-butyl-cyclohexyl, 4-octadecyl-cyclohexyl, n-dodecyl—S—CH$_2$CH$_2$—, n-octadecyl—S—CH$_2$—CH$_2$—CH$_2$—, n-octadecyl—O—CO—CH$_2$S—CH$_2$—CH$_2$—, i-octyl—O—CO—CH$_2$—S—CH$_2$—CH$_2$—CH$_2$—and n-dodecyl—O—CO—CH$_2$—CH$_2$—S—CH$_2$—CH$_2$—CH$_2$.

b. 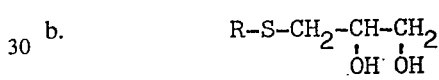

R: n-dodecyl, n-octyl, n-decyl, n-hexadecyl, n-eicosyl, n-hexacosyl, iso-tridecyl, 1-octyl—O—CO—CH$_2$—, n-dodecyl—O—CO—CH$_2$—, n-octadecyl—O—CO—CH$_2$—, iso-octadecyl—O—CO—CH$_2$—CH$_2$—, dodecyl-phenyl, dodecyl-benzyl,

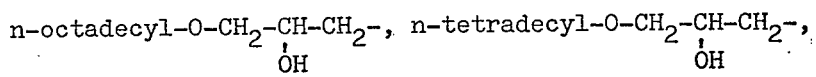

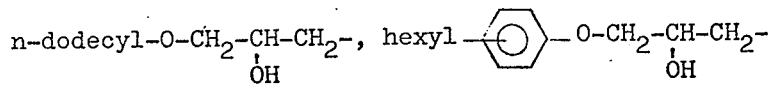

and

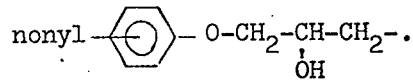

n-Alkyls as radicals of appropriate mercaptans which are obtainable analogously to the synthesis reaction described by ZIEGLER for obtaining alcohols, starting from aluminium, hydrogen and ethylene, with subsequent sulphurisation.

c.  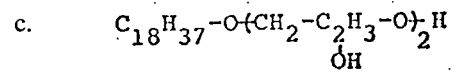

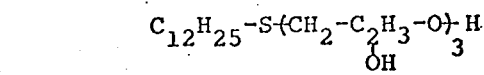

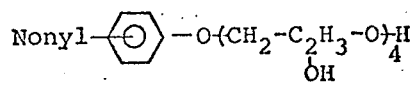

Further compounds of the formula I wherein n is greater than 1 are obtainable by isolation from the appropriate glycidolisation mixtures.

The following additives are preferred:

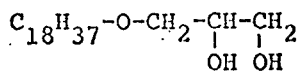

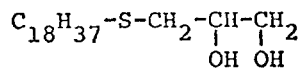

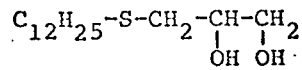

as well as the mixtures wherein the group

has the meaning of

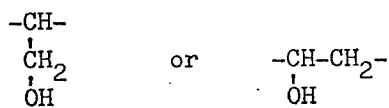

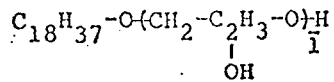

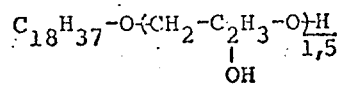

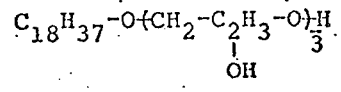

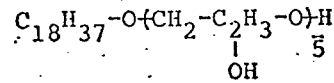

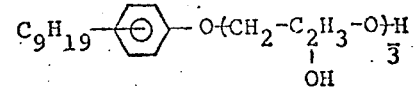

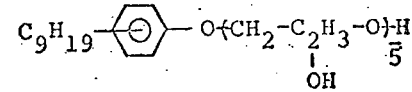

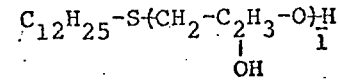

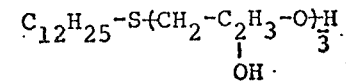

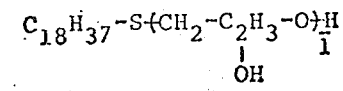

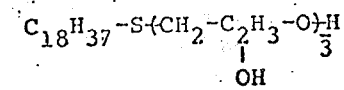

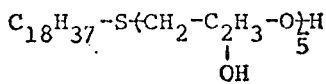

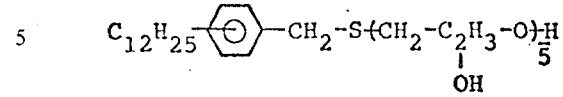

The compounds of the formula I are used as additives for thermoplastics. As such it is possible to use, for example:

1. Polymers which are derived from singly or doubly unsaturated hydrocarbons, such as polyolefines such as, for example, polyethylene, which can optionally be crosslinked, polypropylene, polyisobutylene, polymethylbutene-1, polymethylpentene-1, polybutene-1, polyisoprene, polybutadiene, polystyrene, polyisobutylene, copolymers of the monomers on which the said homopolymers are based, such as ethylene-propylene copolymers, propylene-isobutylene copolymers, stryrene-butadiene copolymers and terpolymers of ethylene and propylene with a diene such as, for example, hexadiene, dicyclopentadiene or ethylidenenorbornene, and mixtures of the abovementioned homopolymers such as, for example, mixtures of polypropylene and polyethylene, polypropylene and polybutene-1, and polypropylene and polyisobutylene.

2. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

3. Polyesters which are derived from dicarboxylic acids and dialcohols and/or from hydroxycarboxylic acids or the corresponding lactones, such as polyethylene glycol terephthalate, and poly-1,4-dimethylolcyclohexane terephthalate.

4. Polyacrylonitrile as well as its copolymers with other vinyl compounds, such as acrylonitrile/butadiene/styrene, acrylonitrile/styrene and acrylonitrile/styrene/acrylic ester copolymers.

5. Unplasticised —also chlorinated —polyvinyl chloride as well as unplasticised copolymers of vinyl chloride, for example with vinyl acetate, and mixtures of these polymers with other copolymers and chlorinated polyolefines with a predominant content of vinyl chloride in the total mixture.

6. Plasticised polyvinyl chloride, also using butadiene-acrylonitrile copolymers, provided the proportion of vinyl chloride in the total mixture predominates.

Possible plasticisers are:

Dibutyl phthalate, di-2-ethylhexyl phthalate, dibutyl sebacate, tributyl acetyl-citrate, tri-2-ethylhexyl acetyl-citrate, diphenyl-2-ethylhexyl phosphate, alkylsulphonic acid esters ($C_{12}-C_{20}$) of phenol and of the cresols, and also polymeric plasticisers such as adipic acid polyesters with 1,3-butanediol and hexanediol, and adipic acid polyesters with 1,3- and/or 1,2-propanediol, of which the free OH groups are optionally acetylated.

7. Polyurethanes and polyureas.

8. Polyacetals, such as polyoxymethylene and polyoxyethylene, as well as polyoxymethylenes which contain ethylene oxide as the comonomer.

Together with the substances of the formula I used according to the invention, the thermoplastics can contain the customary additives used for the processing of these polymers, such as plasticisers, heat-stabilisers, antioxidants, dyestuffs, fillers, lubricants and flameproofing agents. Hydrophilic polymers such as, for example polyethylene oxides and substances related thereto should however at most be present in amounts of 1 percent by weight relative to the thermoplastic, and preferably not be present at all, in order not to have an unfavourable influence on the mechanical properties and processing properties.

The substances according to the invention are incorporated into the substrates in a concentration of 0.01 to 5 percent by weight calculated relative to the material to be processed. Preferably, 0.05 to 2, and especially preferentially 0.1 to 1.0 percent by weight of the substances are incorporated into the material.

The incorporation can be carried out after the polymerisation, for example by mixing the substances and optionally further additives into the melt in accordance with the methods customary in the art, before or during shaping. The substances can also be incorporated in the form of a master batch which contains these compounds, for example, in a concentration of 2.5 to 25 percent by weight, into the polymers to be rendered antistatic. Further details of the method of incorporation can be found in Examples 82–89.

In principle, the substances according to the invention can also be used for the provision of an external antistatic finish. In these cases, the substances can be applied in the dissolved state by dipping or spraying. Suitable solvents are, for example, ethanol, acetone, ethyl acetate and i-propanol, also mixed with water. Even aqueous emulsions are suitable systems.

The preparation of the compounds of the formula I, used according to the invention, in which n denotes 1 to 5, can be carried out according to various processes. Advantageously, glycidol is used as the starting substance.

Phenols react under anionic conditions, at temperatures below 100°C, solely to form the glycerine monoethers. The same is also true of mercaptans as shown by the following equation:

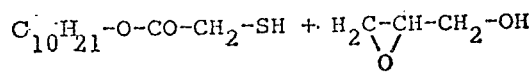

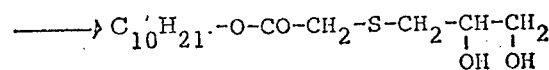

In the case of alcohols, mixtures of different levels of glycidolisation are in principle obtained. However, by using excess alcohol the reaction can be influenced in a favour of the mono-reaction product, that is to say the pure glycerine monoether. The excess alcohol is again removed during working up and added to the next batch.

A second method synthesis which is also known is via epichlorohydrin:

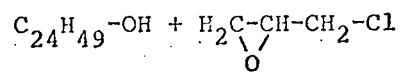

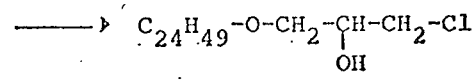

The "chlorohydrin" formed in the first stage yields the desired end product on alkaline saponification. For the preparation of glycerine monothioethers there is a second route via 1-chloro-dihydroxypropane in accordance with the following equation:

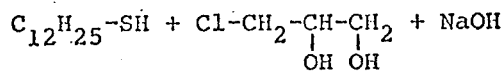

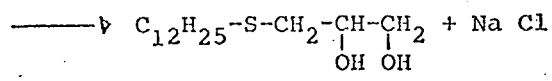

This method can also be used in the phenol series.

A method of preparation for glycerine monothioethers by addition of mercaptan to glycerine monoallyl ethers, as formulated for a representative example:

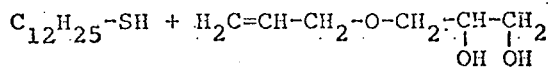

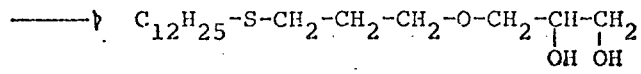

deserves special mention.

A further type of compound is obtained by addition of monothioglycerine to glycidyl ethers, as shown below:

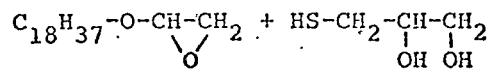

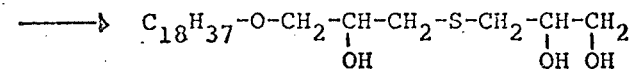

Compounds of the formula I wherein $n$ is greater than 1 can be prepared from the corresponding glycidolisation products with $\bar{n} = 2$ to 5 by fractional molecular distillation or by chromatographic methods of separation, preferably by gel permeation chromatography.

In the products of the formula I used according to the invention in which $\bar{n} = 0.5$ to 8, that is to say in the case of mixtures, glycidolisation products are concerned. They represent an important part of the present invention and are obtainable according to the following generally reaction equation:

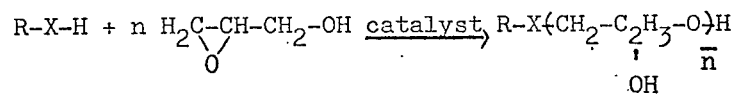

Here, statistical mixtures, with $\bar{n}$ as the average value of the particular degree of glycidolisation, are concerned. The distribution function $\Delta n/n$ relative to $n$ was not determined in more detail. Due to the "distribution," which is subject to the laws of statistics, and which can barely be influenced through the reaction conditions, some starting product always remains in all the glycidolisation products, though the proportion of this starting product decreases with the degree of glycidolisation. $\bar{n}$. The presence of the starting product does not interfere with the technical properties of these products with regard to their application, so that it is possible to dispense with the removal of the starting product.

In the case of the alcohols, such statistical mixtures are produced under all conditions, whilst in the case of mercaptans and phenols they are in particular produced under the conditions of anionic catalysis, at temperatures about 120°C.

Such mixed products shown particularly advantageous antistatic effects. Evidently, the "distribution" has a very favourable influence on the migration phenomena which are decisive for the antistatic surface effect. It should be mentioned particularly that the antistatic finishes achievable therewith are furthermore distinguished by particular stability.

In the case of the glycidolisation derivatives which contain more than one glycidol structural unit in the molecule, two structual types, A and B, are possible:

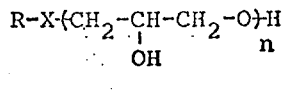 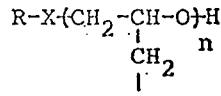

(A) (B)

If the glycidolisation is carried out as an open reaction sequence in reaction steps which are independent of one another, structural type A is preferred. If, however, the reaction is carried out in a closed reaction sequence (in the sense of polymerisation or telomerisation), structural type B is formed. With certain limitations it is possible, through choice of the reaction conditions (catalyst and temperature), to steer the course of the reaction towards structural type A or structural type B.

In the case of alcohols, the glycidolisation, that is to say the reaction with glycidol, best takes place under cationic conditions, with tin-(IV) chloride as the catalyst. The reaction is advantageously carried out by adding the glycidol dropwise to the starting product to which catalyst has been added. However, other cationic types of catalyst, for example FRIEDEL-CRAFTS catalysts, perchlorates and onium salts —also syncatalytic systems — can also be employed successfully. The reaction can be carried out even at room temperature; it is strongly exothermic. Solvents are generally not required. Advantageously, a reaction temperature which is just above the melting point of the alcohol to be reacted, is used. Suitable solvents are inert aromatic compounds (benzene, chlorobenzene and dichlorobenzene), halogenated hydrocarbons such as, for example, sym-tetracholorethane or carbon disulphide.

The reaction products formed under such conditions preferably belong to structural type A. At temperatures above 100°, the formation of B is more strongly favoured.

In the case of phenols, cationic catalysts lead to side-reactions. Here, however, anionic type such as sodium hydroxide, sodium methylate, potassium t-butylate, sodium amide and similar systems can be employed. The first glycidolisation stage takes place even at temperatures below 100°C. Under these conditions, however, a higher degree of glycidolisation ($n > 1$) is not possible. If the reaction is carried out, a priori, at a temperature of 115°–130°C, higher glycidolisation products can also be obtained. Under these conditions, the reaction products represent statistical mixtures also for $n < 1$. In general, the use of a solvent can be dispensed with. However, where a solvent is used, high-boiling ethers such as anisole can above all be employed.

The reaction sequence which takes place under the conditions mentioned bears all the characteristics of a polymerisation. This means that structural type B is preferentially formed.

Both cationic and anionic catalysts can be used for the reaction of mercaptans. As in the case of the phenols, the reaction ends, at temperatures below 100°C, at the first glycidolisation stage at which a single product has been formed. Higher glycidolisation products, these being in the form of statistical mixtures, can only be obtained at temperatures above 120°C. Viewed in total, however, the anionic catalysts provide the more favourable course of the reaction.

Under these conditions the course of the reaction can again be described as a genuine polymerisation, which means that for $\bar{n} > 1$ reaction type B is preferentially formed.

The method described below is best for arriving at the statistical glycidolisation products in the case of X =SO₂:

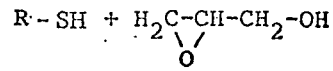

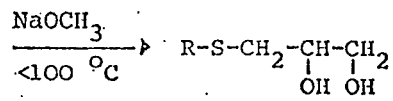

After conversion into the sulphone:

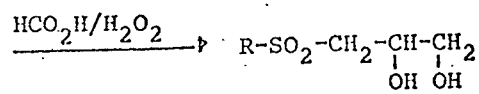

the further glycidolisation can be carried out as in the case of alcohols.

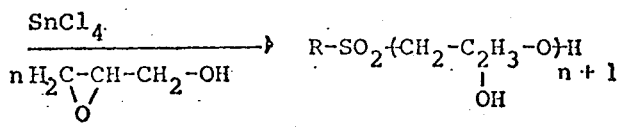

In principle, the conversion into the sulphone stage can also start from the glycidolisation product of a mercaptan, though difficulites can occur in working up, especially in the case of products with a higher degree of glycidolisation.

Examples of starting products for glycidolisation reactions have been listed below.

a. Alcohols: n-octanol, n-decanol, n-dodecanol, n-octadecanol, i-octadecanol (2-ethyl-hexadecanol), oleyl alcohol, hexyldecanol 2-octyldodecanol, a technical $C_{20}/C_{22}$ n-alkyl alcohol mixture, technical $C_{24}/C_{26}$ n-alkyl alcohol mixture, laurylbenzyl alcohol, 1,2-dihydroxydodecane, 1,2-dihydroxy-octadecane, 3-phenylpropanol, 6-phenyl-hexanol, 2-hydroxy-octadecane, 2-hydroxy-dodecane, 11-hydroxy-uncosane and 4-cyclohexanol.

b. Phenols: butylphenol, nonylphenol, dinonylphenol, laurylphenol, dilaurylphenol, hydroquinone monobutyl ether, resorcinol monohexyl ether, p-cyclohexylphenol, t-octylphenol and 3-octadecyloxycarbonylphenol.

c. Mercaptans: octylmercaptan, dodecylmercaptan, t-dodecylmercaptan, octadecylmercaptan, thioglycolic acid lauryl ester, and β-mercaptopropionic acid stearyl ester, and also mercaptans which are obtainable analogously to the synthesis reaction described by ZIEGLER for the production of alcohols, starting from aluminum, hydrogen and ethylene, with subsequent sulphurisation.

Finally, the compounds according to the invention with $n = 1$ can also serve as starting products, the glycidolisation advantageously being carried out cationically.

The invention is explained in more detail in the examples which follow. Percent therein denotes per cent by weight and parts therein denote parts by weight.

EXAMPLE 1

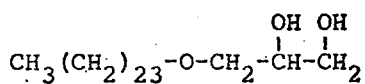

3-(Tetracosyloxy)-propanediol-(1,2)

177 g of n-tetracosyl alcohol and 2 ml of tin tetrachloride are heated to 75°C and 46.3 of epichlorohydrin is added over the course of 30 minutes. The mixture is then stirred for a further 4 hours at 100°C. After cooling 51 g of sodium formate and 200 ml of ethylene glycol are added and the mixture is heated under reflux for a further 4 hours. Thereafter the reaction mixture is taken up in 200 ml of CHCl₃ and twice shaken thoroughly with 300 ml of water, the organic phase is separated off, dried over Na₂SO₄ and filtered, and the filtrate is concentrated. The residue is recrystallised from petroleum ether.

Yield: 155 g (72 percent of theory); melting point 85°C

| Yield: | 155 g (72% of theory); | melting point 85°C |
|---|---|---|
| | C calculated 75.4%, | found 75.2% |
| | H calculated 13.4%, | found 13.2% |
| | O calculated 11.2%, | found 11.4% |

EXAMPLE 2

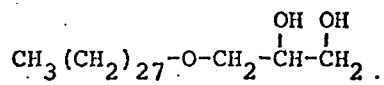

3-(montanyloxy)-propanediol-(1,2)

The synthesis is carried out under the conditions described in Example 1, using the following starting products and reagents: 205 g of montanyl alcohol (melting point: 84°C), 46.3 g of epichlorohydrin, 2 ml of tin tetrachloride, 51 g of sodium formate and 200 ml of ethylene glycol.

| Yield: | 157 g (65% of theory); | melting point 92°C |
|---|---|---|
| | C calculated 76.8%, | found 76.95% |
| | H calculated 13.3%, | found 13.15% |
| | O calculated 9.9%, | found 9.90% |

EXAMPLE 3

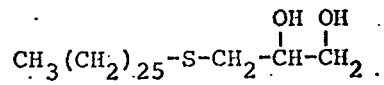

3-(Cerylmercapto)-propanediol-(1,2)

54 g of 3-mercapto-1,2-propanediol, 27 g of sodium methylate and 200 ml of methanol are heated for 30 minutes under reflux and 246 g of ceryl iodide, dissolved in 300 ml of methanol, are then added dropwise at room temperature. Thereafter the mixture is again heated for 2 hours under reflux and after cooling the insoluble matter is filtered off, the filtrate is concentrated and the residue is recrystallised from petroluem ether.

| Yield: | 191 g (81% of theory); | melting point 93°C |
|---|---|---|
| | C calculated 73.7%, | found 73.55% |
| | H calculated 12.8%, | found 12.70% |
| | O calculated 6.8%, | found 6.65% |
| | S calculated 6.8%, | found 6.93% |

EXAMPLE 4

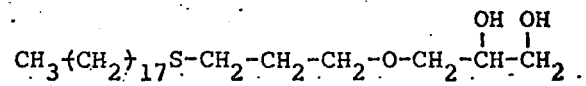

3γ-Octadecylmercapto-propoxy)-propanediol-1,2)

0.8 part of benzoyl peroxide is dissolved in 39.6 parts of glycerine 1-allyl ether. 85.8 parts of octadecylmercaptan are added to this solution and thereafter the reaction mixture is warmed for 3 hours at 90°C. 2 Phases form. The lower phase solidifies after cooling and is separated off and recrystallised from acetone.

EXAMPLE 5

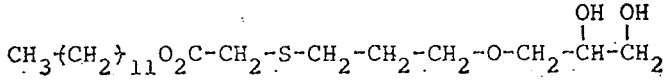

3-[γ-(Dodecyloxycarbonyl-methylmercapto)-propoxyl]-propanediol-(1,2)

0.5 part of benzoyl peroxide is dissolved in 39.7 parts of glycerine 1-allyl ether. 78 parts of thioglycolic acid dodecyl ester are added dropwise to this solution. Thereafter the mixture is stirred for a further hour at 80°–100°C. The reaction product is not purified.

Yield: 117.8 parts (100% of theory); colourless liquid, $n_D^{20}$: 1.4783
S calculated 8.16%, found 8.2%

EXAMPLE 6

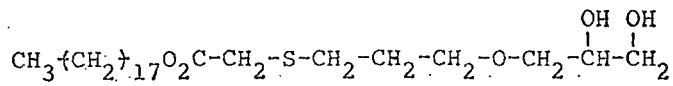

3-[γ-(Octadecyloxycarbonyl-methylmercapto)-propoxy]-propanediol-(1,2)

The synthesis is carried out under the conditions described in Example 5, using the following starting products and reagents: 39.7 parts of glycerine 1-allyl ether, 112.0 parts of thioglycolic acid octadecyl ester and 0.5 part of benzoyl peroxide. The reaction product is not purified.

Yield: 143 parts (100% of theory); waxy consistency;
S calculated 6.72%, found 6.4%

EXAMPLE 7

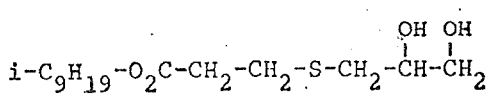

3-[β-(2-i-Nonyloxycarbonyl)-ethylmercapto]-propanediol-1,2

46.5 parts of β-mercaptopropionic acid i-nonyl ester and 0.3 part of sodium methylate are warmed to 40°C and 14.8 parts of glycerine-glycoidol are added in such a way that the temperature does not exceed 40°C. The mixture is then stirred for a further 30 minutes, at 60°C.

Yield: 61.2 parts (100% of theory); yellow, viscous liquid; $n_D^{20}$: 1.4840
S calculated 10.46%, found 10.6%

Yield: 42 parts (33% of theory); crystalline powder; melting point 58–60°C
C calculated 68.85%, found 67.9%
H calculated 12.04%, found 11.8%
S calculated 7.66%, found 7.5%

EXAMPLE 8

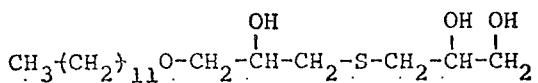

3-(β-Hydroxy-γ-dodecyloxy-propylmercapto)-propanediol-(1,2)

21.6 parts of thioglycerine and 0.2 part of sodium methylate are warmed to 80°C. Thereafter 48.5 parts of dodecyl glycidyl ether are added dropwise at the same temperature and the mixture is stirred for a further 2.5 hours, at 100°C. The reaction product is recrystallised from petroleum ether (100°–140°C).

Yield: 62 parts (88% of theory); crystalline powder, melting point 40°–44°C
S calculated 9.15%, found 8.9%
OH calculated 14.56%, found 14.2%

EXAMPLE 9

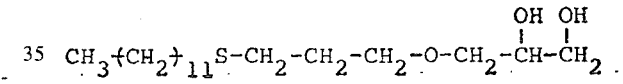

3-γ-Dodecylmercapto-proxy)-propanediol-(1,2)

The synthesis is carried out under the conditions described in Example 5, using the following starting products and reagents: 66.1 parts of glycerine 1-allyl ether, 101.2 parts of dodecylmercaptan and 0.5 of benzoyl peroxide. The end product was recrystallised from acetonitrile.

Yield: 102 parts (61% of theory); crystalline powder; melting point 40-43 °C
S calculated 9.58%, found 9.4%

EXAMPLE 10

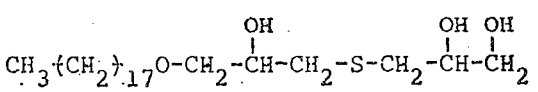

3-(β-Hydroxy-γ-octadecyloxy-propylmercapto)-propanediol-(1,2)

21.6 parts of thioglycerine and 0.25 part of sodium methylate are warmed to 80°C. Thereafter 65.2 parts of stearyl glycidyl ether are added dropwise at the same temperature and the mixutre is stirred for a further 2.5 hours, at 100°C. The reaction product is recrystallised from petroleum ether (100°–140°C).

Yield: 76 parts (87.5% of theory); crystalline powder; melting point 60°–63°C
S calculated 7.39%, found 7.4%
OH calculated 11.75%, found 11.5%

EXAMPLE 11

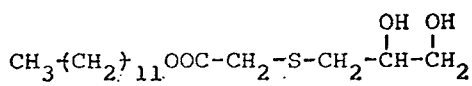

3-[β-Dodecyloxycarbonyl-methylmercapto]-propanediol-(1,2)

The synthesis is carried out under the conditions described in Example 7, using the following starting products and reagants: 78 parts of thioglycolic acid dodecyl ester, 22 parts of glycerine-glycidol and 0.3 part of sodium methylate. The reaction product is not purified.

Yield: 99 parts (99% of theory); yellow, viscous liquid; $n_D^{20}$: 1.4815
S calculated 9.6%, found 9.4%

EXAMPLE 12

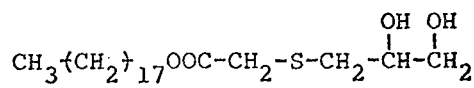

3-[β-(Octadecyloxycarbonyl-methylmercapto]-propanediol-(1,2)

The synthesis is carried out under the conditions described in Example 7, using the following starting products and reagents: 103.3 parts of thioglycolic acid octadecyl ester, 22.2 parts of glycerine-glycidol and 0.3 part of sodium methylate. The reaction product is recrystallised from 500 ml of acetonitrile.

Yield: 60 parts (48% of theory); melting point 52°–55°C
S calculated 7.6%, found 6.8%

EXAMPLES 13–81

(Compare Table 1)

The conditions of preparation and physico-chemical criteria of all important glycidolisation products relating to the present invention are summarised in Table 1. The total OH content (total OH) is determined by acetylation and the vicinal OH content (vic. —OH) is determined by splitting with periodic acid. In the case of the glycidolisation products of the mercaptans this method fails completely; in the case of the glycidolisation products of the phenols, problems can arise. A vapour pressure osmometer is sued for the molecular weight determination.

EXAMPLES 82–89

Antistatic Action

The antistatic effect on the polymers mentioned initially is tested with the aid of an instrument especially developed for this purpose, the STATIC HONESTOMETER (compare CA 66, 86,173 f (1967) and CA 68, 115,247 g (1968) ). This measuring device makes it possible to determine both the tendency of plastics test specimens to acquire a charge, in the form of the charge level (mV), and the charge dissipation over the course of time, in the form of the half-life —the latter being an indirect measure of the surface resistance. Climatic conditions: 45 percent relative atomspheric humidity and 22°C.

Within the scope of the test programme, comparison samples of known antistatic agents were also always tested simultaneously.

EXAMPLE 82

Test in Polypropylene

Samples of the substances according to the invention are mixed into polypropylene powder (MFI 3°–230°C, 2.16) which in turn is stabilised with 0.2percent of a phenolic antioxidant, and the mixture is extruded in a single-screw extruder at 200°–260°C. Test specimens are taken from the pressed sheet first obtained and are tested after appropriate conditioning (45 percent atomspheric humidity and 22°C). Table 2 contains the measured data thus obtained. The table also includes the effects achieved with known antistatic agents. The comparison shows the superiority of the substances according to the invention over commercially available products.

EXAMPLE 83

Test In HIgh Pressure Polyethylene (ldpe)

The substances to be tested are sprinkled onto a commercially available polyethylene of low density (MFI 2°–190°C, 2.16). 0.2 mm thick cast films are produced from the dry blend mixtures at 160°–200°C on a customary extruder and these films are then subjected to the antistatic test. The measured data are summarised in Table 3.

It can be seen from this that even at very low concentrations of additive an excellent antistatic effect can be observed.

EXAMPLE 84

Test In Low Pressure Polyethylene (hdpe)

Pressed sheets are manufactured by means of a single-screw extruder from a polyethylene of high density (MFI 7°–190°C, 2.16 kg) provided with the customary additives, and after addition of the antistatic agent to be tested, and the test specimens taken from the pressed sheets are subjected to the electrostatic test. Table 4 provides information on the results thereby obtained.

The known antistatic based on fatty alkyl-($C_{12}$–$C_{18}$)-diethanolamine is admittedly comparable in effect with the substances according to the invention. The superiority of the latter is above all based on their colour-stabilising effect which the amine product does not display.

EXAMPLE 85

Test In Polyurethane

A 25 percent strength solution in dimethylformamide is prepared from the commercially available product ESTANE 5707, a linear single-component polyester-urethane. After addition of the antistatic agent to be tested, an 0.1 mm thick film is produced from this solution and, after prior drying at 140°C, is subjected to the customary measuring process, using a polypropylene sheet, not provided with an antistatic finish, as the support for the test specimens in the measuring instrument.

The measured data thereby obtained are contained in Table 5.

EXAMPLE 86

Test In Polyacrylonitrile

A 20 percent strength solution in dimethylformamide is prepared with CRYLOR, a fibre-forming polyacrylonitrile, at 80°C, and films 0.1 mm thick are prepared therefrom after addition of the antistatic agent to be tested. After drying at 140°C, their electrostatic behaviour is examined under the same conditions as in the case of the polyurethane. The results are summarised in Table 6.

EXAMPLE 87

Test In Polyamide 6

2 percent of test substance is sprinkled onto fibre-forming dry polyamide-6 granules (solution viscosity of a 1 percent strength solution in sulphuric acid, $\eta_{rel}$: 2.95). The dry blend is spun in a spinning extruder, at 280°C, to give filaments of 20 den, and these are stretched. To remove the spinning preparation, the fibres are washed in petroleum ether and after drying and conditioning they are wound up parallel on a small polypropylene plate, not provided with an antistatic finish, until they form a continuous surface; finally, the electrical properties are determined in the known manner (Table 7).

EXAMPLE 88

Test In Plasticised Polyvinyl Chloride

A mill hide is produced from a commercially available polyvinyl chloride, suspension type, K-value 70, on a laboratory mixing mill at 180°C, using a mixing time of 5 minutes.
Formulation
  100 parts of S-PVC (K-value 70)
  55 parts of dioctyl phthalate
  1 part of organo-tin/sulphur stabiliser (based on: di-butyl-tin/bis-thioglycolic acid-i-octyl ester)
  0.2 part of amide wax
  2 parts of test substance (antistatic agent)

The small test sheets taken from the mill hide are examined in a known manner for their electrostatic properties. Table 8 contains the measured data thereby obtained.

It should here be noted additionally that the substances according to the invention do not have an adverse influence on the heat stability of the PVC.

EXAMPLE 89

Test In Unplasticised Polyvinyl Chloride

A tape 1 mm thick and 40 mm wide is produced from a commercially available polyvinyl chloride, suspension type, K-value 65, by means of a single-screw extruder and slit die, at 200°C material temperature.
Formulation
  100 parts of S-PVC (K-value 65)
  1.5 parts of organo-tin/sulphur stabiliser (based on: di-n-butyl-tin/bis-thioglycolic acid-i-octyl ester)
  0.2 part of montan wax
  1.5 parts of lubricant (based on: synthetic wax ester)
  2.0 parts of test substance (antistatic agent)

The small test sheets taken from the extruded tape are tested in a known manner for their electrostatic properties. Table 9 provides information on the measured data thereby obtained.

As already mentioned, the substances according to the invention have no adverse influence on the heat stability of the PVC, at least not on the initial colour.

EXAMPLE 90

Effect On the Processing Stability

The processing-stabilising effect of the substances according to the invention in various grades of polypropylene is tested by measuring the melt index, at 230°C and 2.16 kg load, on multiple extrusion in a single-screw extruder. The substances are incorporated at 260°C and 100 rpm.

The change in the melt index after 1, 3 and 5 extrusions can be seen in Table 10. Glycerine monostearyl ester is employed as the comparison substance. The effect of the substances according to the invention is superior to that of glycerine monostearyl ester.

EXAMPLE 91

Intrinsic Thermal Stability

Finally, the intrinsic thermal stability of the compounds and substances according to the invention is also examined in comparison to commercially available products.

The test is carried out in an open glass test tube (internal diameter 2.5 mm) using a silicone bath which can be heated electrically. Bubble formation is used as the criterion of decomposition. Should a discolouration occur at the same time, this is also recorded.

After determining the decomposition range at a relatively high speed of heating, the actual decomposition temperature is determined at a speed of heating of 2°C per minute (starting about 50°C below the decomposition temperature found in the preliminary experiment).

The results are summarised in Table 11.

Table 1

Conditions of synthesis and physico-chemical criteria of the glycidolisation products of alcohols, phenols, mercaptans and sulphones (calculated values are shown in parentheses)
(Examples 13–81)

| Example No. | Starting product | Degree of glycidolisation, n | Conditions of synthesis Catalyst | Conditions of synthesis Temperature, ° | % total OH | % vic. OH | Molecular weight | Properties (consistency) |
|---|---|---|---|---|---|---|---|---|
| 13 | n-Octanol | 1 | SnCl$_4$ | 65 | 16.3 (16.6) | 9.0 (16.6) | 183 (204) | $n_D^{20}$: 1.4486 |
| 14 | | 3 | " | 65 | 18.3 (19.3) | 10.5 (9.6) | — | $n_D^{20}$: 1.4679 |
| 15 | n-Dodecanol | 1 | SnCl$_4$ | 65 | 12.3 (13.1) | 7.7 (13.1) | 271 (260) | semi-solid mass |

Table 1—Continued

Conditions of synthesis and physico-chemical criteria of the glycidolisation products of alcohols, phenols, mercaptans and sulphones (calculated values are shown in parentheses)
(Examples 13–81)

| Example No. | Starting product | Degree of glycidolisation, n | Conditions of synthesis Catalyst | Temperature, ° | % total OH | % vic. OH | Molecular weight | Properties (consistency) |
|---|---|---|---|---|---|---|---|---|
| 16 | | 3 | " | 65 | 16.8 (16.6) | 7.0 ( 7.8) | 397 (409) | highly viscous liquids |
| 17 | | 5 | " | 65 | 19.5 (18.3) | 9.5 ( 6.1) | 590 (557) | |
| 18 | n-Pendadecanol | 1 | $SnCl_4$ | 65 | 10.6 (11.2) | 6.6 (11.2) | — | M.p. 43–50° |
| 19 | | 3 | " | 65 | 15.0 (15.1) | 7.3 ( 7.1) | 460 (451) | M.p. 41–50° |
| 20 | n-Octadecanol | 0.5 | $SnCl_4$ | 65 | — | 3.6 ( 5.0) | 270 (307) | M.p. 54–59° |
| 21 | | 0.75 | " | 65 | 7.9 ( 9.1) | 3.8 ( 7.4) | — | M.p. 55–60° |
| 22 | | 1.0 | " | 65 | 9.7 ( 9.9) | 5.6 ( 9.9) | 344 (345) | M.p. 55–60° |
| 23 | | 1.5 | " | 65 | 10.8 (11.1) | 6.3 ( 8.9) | 362 (382) | M.p. 55–60° |
| 24 | | 2 | " | 65 | 11.2 (12.2) | 6.4 ( 8.1) | 417 (419) | M.p 54–58° |
| 25 | | 3 | " | 65 | 14.1 (13.8) | 6.9 ( 6.9) | 442 (493) | M.p. 54–60° |
| 26 | | 5 | " | 65 | 15.2 (15.9) | 8.7 ( 5.3) | — | M.p. 54–58° |
| 27 | | 7 | " | 65 | 16.9 (17.2) | 6.8 ( 4.3) | — | M.p. 50–55° |
| 28 | Mixture: {n-Eicosanol | 1 | $SnCl_4$ | 70 | 8.0 (~8.8) | 4.2 (~8.8) | — | M.p. 55–63° |
| 29 | {n-Docosanol | 3 | " | 70 | 12.8 (~12.7) | 6.8 (~6.4) | — | M.p. 55–63° |
| 30 | Mixture: {n-Tetracosanol | 1 | $SnCl_4$ | 75 | Solubility too low to permit determinations | | | M.p. 65–70° |
| 31 | {n-Hexacosanol | 3 | " | 75 | | | | M.p. 50–65° |
| 32 | 2-Hexyl-decanol | 3 | $SnCl_4$ | 65 | 13.5 (14.6) | 8.7 ( 7.3) | — | viscous liquid |
| 33 | | 5 | " | 65 | 15.1 (16.7) | 6.6 ( 5.6) | — | highly viscous mass |
| 34 | 2-Octyl-dodecanol | 3 | $SnCl_4$ | 65 | 11.1 (13.1) | 6.6 ( 6.5) | — | viscous liquid |
| 35 | | 5 | " | 65 | 13.1 (15.3) | 5.5 ( 5.1) | — | highly viscous mass |
| 36 | 2-Ethylhexadecanol | 1 | $SnCl_4$ | 65 | 9.8 ( 9.9) | 4.9 ( 9.9) | — | $n_D^{20}$: 1.4600 |
| 37 | Oleyl alcohol | 1 | $SnCl_4$ | 65 | 10.0 ( 9.9) | 6.1 ( 9.9) | — | $n_D^{20}$: 1.4701 |
| 38 | | 2 | " | 65 | 11.8 (12.2) | 8.1 ( 8.2) | — | $n_D^{20}$: 1.4728 |
| 39 | | 3 | " | 65 | 13.2 (13.9) | 7.6 ( 6.9) | — | $n_D^{20}$: 1.4760 |
| 40 | | 5 | " | 65 | 15.1 (16.0) | 6.1 ( 5.3) | — | highly viscous liquids |
| 41 | | 6 | " | 65 | 16.0 (16.7) | 5.4 ( 4.8) | — | |
| 42 | 1,2-Dihydroxy-dodecane | 2 | $SnCl_4$ | 65 | 11.9 (11.7) | 8.1 ( 7.8) | — | highly viscous mass |
| 43 | Dodecyl-benzyl alcohol | 1 | $SnCl_4$ | 70 | 9.4 ( 9.7) | 5.6 ( 9.7) | 355 (351) | waxy masses |
| 44 | | 4 | " | 70 | 13.5 (14.8) | 6.4 ( 5.9) | — | |
| 45 | 3-Phenylpropanol-(1) | 1 | $SnCl_4$ | 65 | 16.2 (16.9) | 8.9 (16.9) | 189 (200) | viscous liquid |
| 46 | | 3 | " | 65 | 18.3 (19.0) | 9.4 ( 9.5) | — | semi-solid mass |
| 47 | 1,2-Dihydroxydo-decane | 1 | $SnCl_4$ | 65 | 18.0 (18.4) | 6.9 (12.3) | 290 (276) | semi-solid mass |
| 48 | 1,2-Dihydroxyocta-decane | 2 | $SnCl_4$ | 65 | 14.8 (15.7) | 7.8 ( 7.8) | 470 (435) | M.p. 60–65° |
| 49 | Butylphenol | 1 | $NaNH_2$ | 120 | 15.6 (15.9) | — | 220 (214) | viscous liquid |
| 50 | | 3 | NaOMe | 120 | 19.0 (18.8) | — | 390 (362) | highly viscous mass |
| 51 | Nonylphenol | 1 | NaOMe | 120 | 11.9 (11.6) | 12.1 (11.6) | — | $n_D^{20}$: 1.5165 |
| 52 | | 3 | " | 120 | 15.5 (15.4) | — | 505 (443) | viscous liquid |
| 53 | | 5 | " | 120 | 17.4 (17.3) | — | — | highly viscous masses |
| 54 | | 8 | " | 120 | 17.9 (18.8) | — | — | |
| 55 | Dinonylphenol | 1 | NaOMe | 120 | 8.3 ( 8.1) | — | 440 (421) | viscous liquid |
| 56 | | 4 | " | 120 | 13.8 (13.2) | 6.0 ( 5.3) | — | highly viscous masses |
| 57 | | 7 | " | 120 | 16.3 (15.7) | 4.5 ( 3.9) | 920 (865) | |
| 58 | Dodecylphenol | 2 | K-OCMe₃ | 120 | 12.6 (12.4) | 9.7 ( 8.3) | 450 (411) | viscous liquid |
| 59 | n-Dodecylmercaptan | 1 | $SnCl_4$ | 80 | 11.6 (12.3) | — | 287 (276) | M.p. 40–48° |
| 60 | | 3 | " | 90 | 15.3 (16.0) | — | 456 (425) | semi-solid paste-like masses |
| 61 | | 3 | NaOMe | 120 | 16.2 (16.0) | — | 440 (425) | |
| 62 | | 5 | " | 120 | 17.5 (17.8) | — | 582 (573) | |
| 63 | n-Octadecyl-mercaptan | 0.75 | NaOMe | 120 | 7.5 ( 7.5) | — | — | M.p. 55–68° |
| 64 | | 1 | " | 120 | 10.6 (10.6) | — | — | M.p. 53–65° |
| 65 | | 3 | " | 120 | 13.3 (13.4) | — | — | M.p. 53–56° |
| 66 | | 5 | " | 120 | 15.6 (15.5) | — | — | M.p. 54–58° |
| 67 | t-Dodecylmercaptan | 3 | NaOMe | 120 | 16.5 (16.0) | — | — | $n_D^{20}$: 1.4960 |
| 68 | n-Decylmercaptan | 2 | $BF_3$ | 70 | 15.2 (15.8) | — | 315 (322) | semi-solid paste-like masses |
| 69 | | 3 | " | 70 | 16.5 (17.2) | — | — | |
| 70 | | 4 | " | 70 | 17.9 (18.1) | — | 490 (471) | |

| Example No. | Starting product | Degree of glycidolisation, $\bar{n}$ | Conditions of synthesis Catalyst | Conditions of synthesis Temperature, ° | Analytical data % total OH | Analytical data % vic. OH | Molecular weight | Properties (consistency) |
|---|---|---|---|---|---|---|---|---|
| 71 | Thioglycolic acid lauryl ester | 1 | NaOMe | 110 | 9.6 (10.2) | - | 308 (334) | $n_D^{20}$: 1.4795 |
| 72 | | 3 | " | " | 14.3 (14.1) | - | 496 (483) | highly viscous liquid |
| 73 | n-Octylmercaptan | 2 | SnCl$_4$ | 70 | 16.4 (17.3) | - | - | $n_D^{20}$: 1.4923 |
| 74 | | 3 | " | " | 17.8 (18.5) | - | - | $n_D^{20}$: 1.4946 |
| 75 | Dodecyl-benzyl-mercaptan | 2 | K-OCMe$_3$ | 120 | 11.2 (11.6) | - | - | highly viscous liquids |
| 76 | | 5 | " | " | 14.7 (15.4) | - | - | |
| 77 | | 7 | " | " | 16.1 (16.8) | - | - | |
| 78 | n-C$_{12}$H$_{25}$-SO$_2$-CH$_2$-CH-CH$_2$ with OH OH | 1 | SnCl$_4$ (in Ph.Cl) | 60 | 12.3 (13.0) | 9.5 (8.7) | 370 (393) | M.p. 75–79° |
| 79 | | 3 | " | " | 15.2 (16.1) | 7.3 (6.4) | - | M.p. 65–68° |
| 80 | n-C$_{18}$H$_{37}$-SO$_2$-CH$_2$-CH-CH$_2$ with OH OH | 1 | SnCl$_4$ (in Ph.Cl) | 60 | 10.4 (10.9) | 8.1 (7.3) | 460 (467) | M.p. 84–90° |
| 81 | | 3 | " | " | 13.6 (13.8) | 6.7 (5.5) | - | M.p. 75–80° |

Table 2      Antistatic effect in polypropylene
(Example 82)

| Test substance | | corresponding to Example | added concentration (%) | charge level [mV] | half-life [sec] |
|---|---|---|---|---|---|
| None | | - | - | 1,100 | |
| R-O-(CH$_2$-C$_2$H$_3$-O-)$_{\bar{n}}$H with OH | | | | | |
| R: n-octyl | $\bar{n}$: 3 | 14 | 1.0 | 900 | 2.5 |
| R: n-dodecyl | $\bar{n}$: 1 | 15 | 0.5 | 850 | 0.9 |
| | $\bar{n}$: 3 | 16 | 0.3 | 700 | 0.3 |
| R: n-octadecyl | $\bar{n}$: 0.5 | 20 | 0.5 | 700 | 0.8 |
| | $\bar{n}$: 0.75 | 21 | " | 550 | 0.5 |
| | $\bar{n}$: 1 | 22 | " | 550 | 0.3 |
| | $\bar{n}$: 1.5 | 23 | " | 550 | <0.3 |
| | $\bar{n}$: 3 | 25 | " | 800 | 0.6 |
| | $\bar{n}$: 5 | 26 | " | 900 | 3.6 |
| | $\bar{n}$: 7 | 27 | " | 900 | 5.4 |

| Test substance | | corresponding to Example | added concentration (%) | charge level [mV] | half-life [sec] |
|---|---|---|---|---|---|
| R: Mixture: n-eicosyl n-docosyl | $\bar{n}$: 1 | 28 | 0.5 | 700 | 0.3 |
| | $\bar{n}$: 3 | 29 | 0.5 | 850 | 0.6 |
| R: Mixture n-tetracosyl n-hexacosyl | $\bar{n}$: 1 | 30 | 0.5 | 800 | 1.4 |
| | $\bar{n}$: 3 | 31 | 1.0 | 750 | 1.2 |
| R: 2-hexyl-decyl | $\bar{n}$: 3 | 32 | 0.5 | 700 | 0.5 |
| | $\bar{n}$: 5 | 33 | 0.5 | 700 | 0.5 |
| R: 2-octyl-dodecyl | $\bar{n}$: 3 | 34 | 0.5 | 950 | 5.7 |
| | $\bar{n}$: 5 | 35 | 0.5 | 800 | 0.7 |
| R: 2-ethyl-hexadecyl | $\bar{n}$: 1 | 36 | 0.5 | 650 | 0.3 |
| R: oleyl | $\bar{n}$: 2 | 38 | 0.1 | 700 | 0.3 |
| | $\bar{n}$: 5 | 40 | 0.5 | 750 | 0.5 |
| | $\bar{n}$: 6 | 41 | 0.5 | 900 | 2.5 |
| R: dodecyl-benzyl | $\bar{n}$: 1 | 43 | 0.5 | 600 | 0.5 |
| | $\bar{n}$: 4 | 44 | 0.5 | 750 | 1.0 |

| Test substance | | corresponding to Example | added concentration (%) | charge level [mV] | half-life [sec] |
|---|---|---|---|---|---|
| R: 3-phenyl-propyl | $\bar{n}$: 3 | 46 | 1.0 | 850 | 2.0 |
| R: 2-hydroxyoctadecyl | $\bar{n}$: 2 | 48 | 0.5 | 800 | 0.3 |
| R: nonyl-phenyl | $\bar{n}$: 1 | 51 | 0.5 | 900 | 20 |
| | $\bar{n}$: 3 | 52 | 0.5 | 650 | 0.3 |
| | $\bar{n}$: 5 | 53 | 0.5 | 700 | 1.0 |
| | $\bar{n}$: 8 | 54 | 0.5 | 900 | 1.1 |
| R: dinonyl-phenyl | $\bar{n}$: 4 | 56 | 0.5 | 700 | 0.8 |
| $R-S-(CH_2-C_2H_3-O)_{\overline{n}} H$ <br> $\quad\quad\quad OH$ | | | | | |
| R: n-decyl | $\bar{n}$: 3 | 69 | 0.5 | 650 | 0.5 |
| R: t-dodecyl | $\bar{n}$: 3 | 67 | 0.5 | 700 | 0.6 |
| R: n-octadecyl | $\bar{n}$: 0.75 | 63 | 0.5 | 500 | 0.3 |
| | $\bar{n}$: 1 | 64 | 0.5 | 550 | 0.3 |
| | $\bar{n}$: 3 | 65 | 1.0 | 550 | 0.3 |
| | $\bar{n}$: 5 | 66 | 0.5 | 900 | 1.0 |
| R: dodecyl-O-CO-$CH_2$- | $\bar{n}$: 1 | 71 | 0.5 | 900 | 4.9 |

| Test substance | | corresponding to Example | added concentration (%) | charge level [mV] | half-life [sec] |
|---|---|---|---|---|---|
| R: dodecyl-benzyl | $\bar{n}$: 2 | 75 | 0.5 | 550 | 0.3 |
| $R-SO_2-(CH_2-C_2H_3-O)_{\overline{n}} H$ <br> $\quad\quad\quad\quad OH$ | | | | | |
| R: n-dodecyl | $\bar{n}$: 1 | 78 | 0.5 | 800 | 0.5 |
| | $\bar{n}$: 3 | 79 | 0.5 | 700 | 0.8 |
| R: n-octadecyl | $\bar{n}$: 3 | 81 | 1.0 | 750 | 0.5 |
| $R-O-CH_2-CH-CH_2$ <br> $\quad\quad\quad CH\ OH$ | | | | | |
| R: n-dodecyl | | * | 2.0 | 920 | 30 |
| R: n-tetradecyl | | * | 1.0 | 800 | 5 |
| R: n-octadecyl | | * | 0.5 | 600 | <0.3 |
| R: n-octacosyl | | 2 | 0.5 | 600 | <0.3 |
| R: $C_{18}H_{37}$-O-CO-$CH_2$-S-$(CH_2)_3$ | | 6 | 2.0 | 900 | 3 |
| R: $C_{12}H_{25}$-S-$(CH_2)_2CH_2$- | | 9 | 1.0 | 850 | 1 |
| R-S-$CH_2$-CH-$CH_2$ <br> $\quad\quad OH\ OH$ | | | | | |
| R: n-decyl | | * | 0.5 | 1,000 | 60 |

* known substances

| Test substance | corresponding to Example | added concentration (%) | charge level [mV] | half-life [sec] |
|---|---|---|---|---|
| R: n-dodecyl | * | 0.5 | 620 | 1.4 |
| R: n-hexadecyl | * | 0.5 | 900 | 0.6 |
| R: n-octadecyl | * | 0.5 | 550 | 0.3 |
| R: $C_{12}H_{25}-O-CH_2-\underset{OH}{CH}-CH_2-$ | 8 | 1.0 | 950 | 0.6 |
| R: i-nonyl-O-CO-$CH_2$-$CH_2$- | 7 | 0.5 | 1,050 | 5 |
| R: n-dodecyl-O-CO-$CH_2$- | 11 | 0.5 | 1,000 | 0.5 |
| R: n-octadecyl-O-CO-$CH_2$- | 12 | 0.5 | 700 | 0.3 |
| R: $C_{18}H_{37}-O-CH_2-\underset{OH}{CH}-CH_2-$ | 10 | 2.0 | 900 | 0.5 |

* known substances

Table 3    Antistatic effect in high pressure polyethylene (ldpe)

(Example 83)

| Test substance | corresponding to Example | added concentration (%) | charge level [mV] | half-life [sec] |
|---|---|---|---|---|
| None | | – | 1,100 | ∞ |
| $R-O-CH_2-\underset{OH}{CH}-\underset{OH}{CH_2}$ | | | | |
| R: n-octadecyl | * | 0.1 | 420 | 0.3 |
| | * | 0.2 | 460 | 0.3 |
| | * | 0.3 | 360 | 0.3 |
| | * | 0.4 | 260 | 0.3 |
| | * | 0.5 | 340 | 0.3 |
| $R-S-CH_2-\underset{OH}{CH}-\underset{OH}{CH_2}$ | | | | |
| R: n-hexacosyl | 3 | 0.2 | 160 | 0.3 |

* known substances

| Test substance | corresponding to Example | added concentration (%) | charge level [mV] | half-life [sec] |
|---|---|---|---|---|
| $R-O-(CH_2-\underset{OH}{CH}-O)_nH$ | | | | |
| R: n-octadecyl  $\bar{n}$: 1 | 22 | 0.5 | 300 | 0.3 |
| $\bar{n}$: 2 | 24 | 0.5 | 300 | 0.3 |
| $\bar{n}$: 3 | 25 | 0.5 | 360 | 0.5 |

Table 4   Antistatic effect in low pressure polyethylene (hdpe)
(Example 84)

| Test substance | | corresponding to Example | added concentration (%) | charge level [mV] | half-life [sec] |
|---|---|---|---|---|---|
| None | | | - | 1,100 | ∞ |
| $R-O-(CH_2-C_2H_3-O)_n-H$<br>          $|$<br>         $OH$ | | | | | |
| R: n-octadecyl | $\bar{n}$: 3 | 25 | 1.0 | 900 | 27 |
| R: n-dodecyl | $\bar{n}$: 1 | 15 | 1.0 | 900 | 6.3 |
| | $\bar{n}$: 3 | 16 | 1.0 | 600 | 0.3 |
| | $\bar{n}$: 5 | 17 | 1.0 | 700 | 1.5 |
| R: nonyl-phenyl | $\bar{n}$: 3 | 52 | 1.0 | 380 | 0.3 |
| | $\bar{n}$: 5 | 53 | 1.0 | 600 | 0.3 |
| $R-S-(CH_2-C_2H_3-O)_n-H$<br>          $|$<br>         $OH$ | | | | | |
| R: n-octadecyl | $\bar{n}$: 3 | 65 | 1.0 | 800 | 1.1 |
| | $\bar{n}$: 5 | 66 | 1.0 | 900 | 5.1 |

Table 5   Antistatic effect in polyester-urethane
(Example 85)

| Test substance | | corresponding to Example | added concentration (%) | charge level [mV] | half-life [sec] |
|---|---|---|---|---|---|
| None | | | - | 800 | 26 |
| $R-O-(CH_2-C_2H_3-O)_n-H$<br>          $|$<br>         $OH$ | | | | | |
| R: n-octadecyl | $\bar{n}$: 1 | 22 | 1.0 | 50 | 0.3 |
| | | 22 | 2.0 | 30 | 0.3 |
| R: nonylphenyl | $\bar{n}$: 5 | 53 | 1.0 | 100 | 0.8 |
| $R-O-CH_2-CH-CH_2$<br>           $|$    $|$<br>          $OH$ $OH$ | | | | | |
| R: n-octadecyl | | ✶ | 1.0 | 40 | 0.3 |
| R: n-tetradecyl | | ✶ | 1.0 | 45 | 0.3 |
| $R-S-CH_2-CH-CH_2$<br>           $|$    $|$<br>          $OH$ $OH$ | | | | | |
| R: n-octadecyl | | ✶ | 1.0 | 34 | 0.3 |
| R: n-dodecyl | | ✶ | 1.0 | 40 | 0.3 |

✶ known substances

Table 6
(Example 86)     Antistatic effect in polyacrylonitrile

| Test substance | | corresponding to Example | added concentration (%) | charge level [mV] | half-life [sec] |
|---|---|---|---|---|---|
| None | | | | 1,000 | 20 |
| $R-O(CH_2-C_2H_3-O)_{\bar{n}}H$<br>$\quad\quad\quad\quad\;\; OH$ | | | | | |
| R: pentadecyl | $\bar{n}$: 3 | 19 | 1.0 | 700 | 0.5 |
| R: 2-hexyldecyl | $\bar{n}$: 5 | 33 | 1.0 | 800 | 0.6 |
| $R-O-CH_2-CH-CH_2$<br>$\quad\quad\quad\;\; OH\;\; OH$ | | | | | |
| R: n-octadecyl | | ✶ | 1.0 | 750 | 0.6 |
| R: $H_3C(CH_2)_7CH=HC(CH_2)_7CH_2-$ | | ✶ | 1.0 | 800 | 1.5 |
| $R-S(CH_2-C_2H_3-O)_{\bar{n}}H$<br>$\quad\quad\quad\quad\;\; OH$ | | | | | |
| R: dodecyl | $\bar{n}$: 3 | 61 | 1.0 | 400 | 0.3 |
| | $\bar{n}$: 5 | 62 | 1.0 | 350 | 0.3 |
| $R-S-CH_2-CH-CH_2$<br>$\quad\quad\quad\;\; OH\;\; OH$ | | | | | |
| R: n-octadecyl | | ✶ | 1.0 | 550 | 0.3 |

✶ known substances

Table 7
(Example 87)     Antistatic effect in polyamide 6

| Test substance | | corresponding to Example | added concentration (%) | charge level [mV] | half-life [sec] |
|---|---|---|---|---|---|
| None | | | – | 1,200 | >60 |
| $R-O(CH_2-C_2H_3-O)_{\bar{n}}H$<br>$\quad\quad\quad\quad\;\; OH$ | | | | | |
| R: dodecylphenyl | $\bar{n}$: 2 | 58 | 2.0 | 1,000 | 5 |
| R: dodecyl | $\bar{n}$: 5 | 17 | 2.0 | 900 | 2 |
| $R-O-CH_2-CH-CH_2$<br>$\quad\quad\quad\;\; OH\;\; OH$ | | | | | |
| R: n-octadecyl | | ✶ | 2.0 | 1,100 | 6 |
| R: n-hexadecyl | | ✶ | 2.0 | 1,100 | 4 |

✶ known substances

Table 8
(Example 88)

Antistatic effect in plasticised polyvinyl chloride

| Test substance | | corresponding to Example | added concentration (%) | charge level [mV] | half-life [sec] |
|---|---|---|---|---|---|
| None | | - | - | 400 | 0.3 |
| $R\text{-}O\text{-}(CH_2\text{-}C_2H_3\text{-}O)_{\bar{n}}H$ <br>                       $\|$ <br>                       OH | | | | | |
| R: octadecyl | $\bar{n}$: 3 | 25 | 2.0 | 120 | 0.3 |
| | $\bar{n}$: 5 | 26 | 2.0 | 110 | 0.3 |
| R: nonylphenyl | $\bar{n}$: 3 | 52 | 2.0 | 150 | 0.3 |
| $R\text{-}S\text{-}(CH_2\text{-}C_2H_3\text{-}O)_{\bar{n}}H$ <br>                       OH | | | | | |
| R: octadecyl | $\bar{n}$: 3 | 61 | 2.0 | 100 | 0.3 |
| R: dodecyl-benzyl | $\bar{n}$: 5 | 76 | 2.0 | 130 | 0.3 |
| $R\text{-}X\text{-}CH_2\text{-}CH\text{-}CH_2$ <br>                    OH  CH | | | | | |
| R: octadecyl     X : O | | ⁎ | 2.0 | 170 | 0.3 |
| R: octadecyl     X : S | | ⁎ | 2.0 | 170 | 0.3 |

⁎ known substances

Table 9
(Example 89)

Antistatic effect in unplasticised polyvinyl chloride

| Test substance | | corresponding to Example | added concentration (%) | charge level [mV] | half-life [sec] |
|---|---|---|---|---|---|
| None | | - | - | 1,000 | ∞ |
| $R\text{-}O\text{-}(CH_2\text{-}C_2H_3\text{-}O)_{\bar{n}}H$ <br>                       OH | | | | | |
| R: octadecyl | $\bar{n}$: 3 | 25 | 2.0 | 430 | 1.0 |
| | $\bar{n}$: 5 | 26 | 2.0 | 480 | 0.9 |
| | $\bar{n}$: 7 | 27 | 2.0 | 520 | 0.3 |
| R: oleyl | $\bar{n}$: 6 | 41 | 2.0 | 560 | 1.1 |
| R: nonylphenyl | $\bar{n}$: 8 | 54 | 2.0 | 470 | 0.8 |
| $R\text{-}S\text{-}(CH_2\text{-}C_2H_3\text{-}O)_{\bar{n}}H$ <br>                       OH | | | | | |
| R: dodecyl | $\bar{n}$: 5 | 62 | 2.0 | 520 | 1.1 |
| R: octadecyl | $\bar{n}$: 5 | 66 | 2.0 | 420 | 0.5 |
| R: dodecyl-benzyl | $\bar{n}$: 7 | 77 | 2.0 | 490 | 0.7 |

Table 10    Effect on the processing stability of polypropylene
(Example 90)

| Test substance (added concentration: 0.5%) | | corresponding to Example | melt indices after extrusions | | |
|---|---|---|---|---|---|
| | | | 1 | 3 | 5 |
| None | | | 10 | 23 | 33 |
| $R-O(CH_2-C_2H_3-O)_{\bar{n}}H$<br>　　　　　　$\|$<br>　　　　　　$OH$ | | | | | |
| R: n-octadecyl | $\bar{n}$: 1 | 22 | 4.4 | 6.2 | 7.9 |
| | $\bar{n}$: 3 | 25 | 4.0 | 5.9 | 7.6 |
| R: nonylphenyl | $\bar{n}$: 1 | 51 | 4.4 | 6.1 | 9.0 |
| $R-S(CH_2-C_2H_3-O)_{\bar{n}}H$<br>　　　　　　$\|$<br>　　　　　　$OH$ | | | | | |
| R: n-octadecyl | $\bar{n}$: 3 | 65 | 5.1 | 7.3 | 10.0 |
| $R-O-CH_2-CH-CH_2$<br>　　　　　$\|$　$\|$<br>　　　　　$OH$　$OH$ | | | | | |
| R: n-octadecyl | | ✶ | 4.1 | 7.2 | 10.5 |
| R: dodecyl-$S(CH_2)_3$ | | 9 | 4.5 | 6.1 | 8.1 |

✶ known substances

| Test substance (added concentration: 0.5%) | | corresponding to Example | melt indices after extrusions | | |
|---|---|---|---|---|---|
| | | | 1 | 3 | 5 |
| $R-S-CH_2-CH-CH_2$<br>　　　　　$\|$　$\|$<br>　　　　　$OH$　$OH$ | | | | | |
| R: n-octadecyl | | ✶ | 4.1 | 7.5 | 12.5 |
| $R-SO_2(CH_2-C_2H_3-O)_{\bar{n}}H$<br>　　　　　　　$\|$<br>　　　　　　　$OH$ | | | | | |
| R: dodecyl | $\bar{n}$: 3 | 79 | 4.5 | 8.0 | 10.8 |

✶ known substances

Table 11    Decomposition temperatures of substances according to the invention and of known antistatic agents
(Example 91)

| Test substance | | corresponding to Example | decomposition temperature (°C) | decomposition criteria | |
|---|---|---|---|---|---|
| | | | | bubble formation | discolour-ation |
| $R-X-CH_2-CH-CH_2$<br>　　　　　　$\|$　$\|$<br>　　　　　　$OH$　$OH$ | | | | | |
| R: n-octadecyl | X : O | ✶ | 255 | + | |
| R: n-tetracosanyl | X : O | 1 | 260 | + | |
| R: n-octadecyl | X : S | ✶ | 235 | + | |
| $R-O(CH_2-C_2H_3-O)_{\bar{n}}H$<br>　　　　　　$\|$<br>　　　　　　$OH$ | | | | | |
| R: n-octadecyl | $\bar{n}$: 1 | 22 | 240 | + | |
| R: 2-hexyl-decyl | $\bar{n}$: 3 | 32 | 265 | | |
| R: nonylphenyl | $\bar{n}$: 3 | 52 | 190 | + | + |
| $R-S(CH_2-C_2H_3-O)_{\bar{n}}H$<br>　　　　　　$\|$<br>　　　　　　$OH$ | | | | | |
| R: n-octadecyl | $\bar{n}$: 1 | 64 | 240 | + | |
| R: n-dodecyl | $\bar{n}$: 3 | 61 | 255 | + | |
| R: dodecylbenzyl | $\bar{n}$: 2 | 75 | 210 | + | |

✶ known substances

| Test substance | corresponding to Example | decomposition temperature (°C) | decomposition criteria | |
|---|---|---|---|---|
| | | | bubble formation | discolouration |
| Known products | | | | |
| Product based on stearic acid diethanolamide | | 130 | + | + |
| Lauric acid polyethylene glycol ester (molecular weight: 400) | | 170 | + | + |
| Cationic product based on fatty alkylamine | | 170 | + | |
| Cationic product based on fatty alkylamine | | 220 | + | + |
| Anionic product based on fatty alkyl sulphonate | | 160 | + | + |
| Product based on fatty alkyl-polyethylene glycol ether | | 125 | + | + |
| Product based on quaternary fatty alkyl-ammonium compound | | 200 | + | |
| Product based on quaternary fatty alkyl-ammonium compound | | 120 | + | |
| Product based on nonylphenol-polyethylene glycol ether | | 170 | + | + |

What we claim is:

1. Antistatic thermoplastics which contain 0.01 to 5 per cent by weight, relative to the thermoplastic, of a compound or mixtures of the formula I R—X—(CH$_2$—Y—O)$_n$H   (I)

in which X denotes —O—, —S— or —SO$_2$, Y denotes

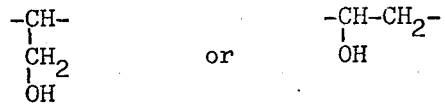

$n$ denotes the nubmer 1 to 5 or $\bar{n}$ as an average value denotes a number between 0.5 and 8 and R, in the case of $n$ =1, denotes alkyl or phenylalkyl with a total of 12 to 30 C atoms, which can be linear or have short chain branches of at most 2 C atoms and can also be interrupted by one or more different groups —O—, —S—, —CO$_2$—, —HC=CH—, phenylene or

or R, in the case of $n$ =2 to 5 or $\bar{n}$ =0.5 to 8, denotes alkyl with 8 to 30 C atoms which may be linear or branched and can also be interrupted by —O—, —S—, —CO$_2$—, —HC=HC— or

phenylalkyl with an alkylene radical of 1 to 3 C atoms which can additionally be substituted at the phenyl nucleus by alkyl with up to 18 C atoms, with the total radical having to have at least 9 C atoms, alkylphenyl with 9 -30 C atoms, alkoxyphenyl with 3 to 12 C atoms in the alkyl radical, alkoxycarbonylphenyl with 2 to 18 carbon atoms in the alkyl radical or alkylated cyclohexyl with 9 to 30 C atoms and, optionally in addition to further additives, at most 1 per cent by weight of hydrophilic polymers, relative to the thermoplastic.

2. Antistatic thermoplastics according to claim 1, characterised in that they do not contain any hydrophilic polymers as additives.

3. Antistatic thermoplastics according to claim 1, characterised in that the thermoplastic is a polyolefine.

4. Antistatic thermoplastics according to claim 3, characterised in that the polyolefine is polypropylene or high pressure polyethylene.

5. Antistatic thermoplastics according to claim 1, characterised in that the thermoplastic is polyvinyl chloride.

6. Antisatic thermoplastics according to claim 1, characterised in that the thermoplastic is a polyurethane.

7. Antistatic thermoplastics according to claim 1, characterised in that they contain substances of the formula (I) in which Y represents

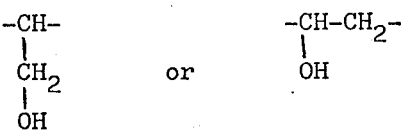

X represents —O— or —S—, $\bar{n}$ representsl or $n$ (as an average value) represents a number between 1 to 5 and R represents unbranched alkyl with 12 to 18 C atoms, alkylbenzyl with 9 to 12 C atoms in the alkyl chain.

8. Antistatic thermoplastics according to claim 1, characterised in that they contain substances of the formula (I) in which Y represents

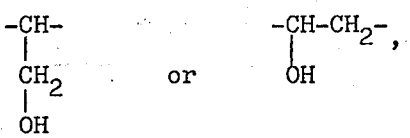

X represents O, $n$ represents 1 or $\bar{n}$ (as an average value) represents a number between 1 and 5 and R represents unbranched alkyl with 12 to 18 C atoms.

9. Antistatic thermoplastics according to claim 1, characterised in that they contain mixtures of the formula

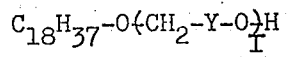

in which Y represents $-\underset{\underset{\underset{OH}{|}}{\overset{|}{CH_2}}}{\overset{|}{CH-}}$ or $-\underset{\underset{OH}{|}}{\overset{}{CH}}-CH_2-$ 10. Antistatic thermoplastics according to claim 1, characterised in that they contain substances of the formula (I) in amounts of 0.05 to 2 percent by weight relative to the thermoplastic.

* * * * *

UNITED STATES PATENT OFFICE
CERTIFICATE OF CORRECTION

PATENT NO. : 3,879,346
DATED : April 22, 1975
INVENTOR(S) : Hans-Helmut Friedrich, Helmut Linhart and Hermann Otto Wirth It is certified that error appears in the above-identified patent and that said Letters Patent are hereby corrected as shown below:

Column 3, line 15 after "as" insert -- an --.

Column 3, line 24 in the formula cancel "1" and insert -- $\bar{1}$ --.

Column 4, line 24 cancel "n-dodecyl-S-$CH_2CH_2$-" and insert -- n-dodecyl-S-$CH_2CH_2CH_2$- --.

Column 11, line 22 cancel "4-cyclohexanol" and insert -- 4-nonyl-cyclohexanol --.

Column 15, line 57 cancel "sued" and insert -- used --.

Column 17 and 18 and also column 19 and 20, in Table 1 under heading "Degree of glycidolisation" cancel "n" and insert -- $\bar{n}$ -- on both pages.

Claim 1, line 36 cancel "nubmer" and insert -- number --.

Claim 7, line 42 cancel "$\bar{n}$represents 1 or n" and insert -- n represents 1 or $\bar{n}$ --.

Claim 7, line 44 after "atoms," insert -- alkylphenyl with 9 to 12 C atoms in the alkyl chain or --.

Signed and Sealed this thirteenth Day of April 1976

[SEAL]

Attest:

RUTH C. MASON
Attesting Officer

C. MARSHALL DANN
Commissioner of Patents and Trademarks